(12) United States Patent
Matsubara et al.

(10) Patent No.: US 10,107,391 B2
(45) Date of Patent: Oct. 23, 2018

(54) TRANSMISSION WITH LOCKUP CLUTCH

(71) Applicant: TOYOTA JIDOSHA KABUSHIKI KAISHA, Toyota-shi, Aichi-ken (JP)

(72) Inventors: Keigo Matsubara, Nagoya (JP); Ayumu Sagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 75 days.

(21) Appl. No.: 15/463,697

(22) Filed: Mar. 20, 2017

(65) Prior Publication Data

US 2017/0276243 A1 Sep. 28, 2017

(30) Foreign Application Priority Data

Mar. 22, 2016 (JP) .................................. 2016-057001

(51) Int. Cl.
| | |
|---|---|
| F16H 61/14 | (2006.01) |
| F16D 25/0635 | (2006.01) |
| F16D 48/02 | (2006.01) |
| F16D 48/06 | (2006.01) |
| F16H 45/02 | (2006.01) |
| F16D 25/0638 | (2006.01) |

(52) U.S. Cl.
CPC ....... F16H 61/143 (2013.01); F16D 25/0635 (2013.01); F16D 25/14 (2013.01); F16D 48/066 (2013.01); F16H 45/02 (2013.01); F16D 25/0638 (2013.01); F16D 2500/1045 (2013.01); F16D 2500/10412 (2013.01); F16D 2500/70426 (2013.01); F16H 2061/145 (2013.01)

(58) Field of Classification Search
CPC .. F16H 61/143; F16H 2061/145; F16D 25/14; F16D 48/066
See application file for complete search history.

(56) References Cited

U.S. PATENT DOCUMENTS 7,643,924 B2 *  1/2010  Kawamura ............. F16H 61/12
                                                       701/107
2004/0229728 A1 * 11/2004  Oshima ................. F16H 61/143
                                                       477/176

(Continued)

FOREIGN PATENT DOCUMENTS

| EP | 3279521 A1 | 2/2018 |
| JP | 2004-108551 A | 4/2004 |

(Continued)

*Primary Examiner* — Edwin A Young
(74) *Attorney, Agent, or Firm* — Oliff PLC (57) ABSTRACT

In a transmission with a lockup clutch, in a case where zero-slip control of the lockup clutch is not established (converged) within a predetermined time, a sweep increase of a lockup clutch hydraulic pressure starts at an increase rate smaller than a normal increase rate in a case where the zero-slip control is established within the predetermined time, the increase rate until the end of the sweep increase is set to be equal to or less than the normal increase rate, and in addition, a hydraulic pressure at the time of the end of the sweep increase is set to be equal to or greater than a hydraulic pressure in a case where the zero-slip control is established within the predetermined time. With such control, in a case where the zero-slip state is not brought, suppressing the occurrence of shock when complete engagement is carried out.

1 Claim, 11 Drawing Sheets (56) References Cited

U.S. PATENT DOCUMENTS

2011/0060509 A1* 3/2011 Otanez ................. F16H 61/143
                                                          701/58
2014/0332333 A1   11/2014 Yamawaki et al.

FOREIGN PATENT DOCUMENTS

| JP | 2006-090442 A | 4/2006 |
|----|---------------|--------|
| WO | 2013/073646 A1 | 5/2013 |
| WO | 2016/158077 A1 | 10/2016 |
| WO | 2017/135205 A1 | 8/2017 |

* cited by examiner

|  | C1 | C2 | C3 | C4 | B1 | B2 |
|---|---|---|---|---|---|---|
| 1st | ○ | — | — | — | — | ○ |
| 2nd | ○ | — | — | — | ○ | — |
| 3rd | ○ | — | ○ | — | — | — |
| 4th | ○ | — | — | ○ | — | — |
| 5th | ○ | ○ | — | — | — | — |
| 6th | — | ○ | — | ○ | — | — |
| 7th | — | ○ | ○ | — | — | — |
| 8th | — | ○ | — | — | ○ | — |
| Rev | — | — | ○ | — | — | ○ |

FIG. 3

FIG. 4
LOCKUP OFF

FIG. 5
LOCKUP ON

TRANSMISSION WITH LOCKUP CLUTCH

CROSS-REFERENCE TO RELATED APPLICATIONS

The disclosure of Japanese Patent Application No. 2016-057001 filed on Mar. 22, 2016 including the specification, drawings and abstract is incorporated herein by reference in its entirety.

BACKGROUND

1. Technical Field

The present disclosure relates to a transmission with a lockup clutch capable of regulating a differential of a fluid coupling (torque converter).

2. Description of Related Art

In control of a lockup clutch which regulates a differential of a fluid coupling (torque converter), in a case of performing zero-slip control for making a slip amount zero, control is performed such that the slip amount is maintained to be equal to or greater than a given slip amount in a predetermined period and then gradually becomes zero (for example, see International Publication No. 2013-073646 (WO 2013-073646 A). With such control, it is possible to bring a zero-slip state with minimum hydraulic pressure, instead of a zero-slip state with excess of hydraulic pressure (excess of clutch coupling capacity).

SUMMARY

On the other hand, in the control of the lockup clutch, if the zero-slip state can be created when transition is performed from the slip state to complete engagement, no shock occurs even if transition is performed to complete engagement. However, the zero-slip state may not be brought according to vehicle traveling conditions even if the zero-slip control described above is performed, and in such a case, if transition is performed to complete engagement, there is a concern that shock occurs.

In WO 2013/073646 A, while the control until the zero-slip state is created is described, how transition is performed to complete engagement after the zero-slip state is brought is not disclosed.

The present disclosure has been accomplished in consideration of such a situation, and provides control of a lockup clutch capable of suppressing the occurrence of shock when transition is performed to complete engagement even in a case where a zero-slip state is not brought even though zero-slip control is performed.

According to an aspect of the present disclosure, there is provided a transmission including a fluid coupling (a commonly called "torque converter" which increases torque input from an input side and transmits torque to an output side is an example of a fluid coupling), a lockup clutch, and an electronic control unit. The fluid coupling is configured to transmit power input from an input side of the fluid coupling to an output side of the fluid coupling through a fluid. The lockup clutch is configured to control a differential of the fluid coupling. The electronic control unit is configured to: (i) execute zero-slip control that makes target differential rotation of differential rotation between the input side of the fluid coupling and the output side of the fluid coupling zero, (ii) sweep-increase a lockup clutch hydraulic pressure to a predetermined hydraulic pressure and then increase the lockup clutch hydraulic pressure to a complete engagement target hydraulic pressure, and (iii) when the zero-slip control is not established within a predetermined time, (a) start a sweep increase at an increase rate smaller than a normal increase rate, the normal increase rate being obtained when the zero-slip control is established within the predetermined time, (b) set an increase rate until an end of the sweep increase to be equal to or less than the normal increase rate, and set a hydraulic pressure at the time of the end of the sweep increase to be equal to or greater than a hydraulic pressure in a case where the zero-slip control is established within the predetermined time.

According to the present disclosure, in a case where the zero-slip control is not established (converged) within the predetermined time, the sweep increase of the lockup clutch hydraulic pressure starts at the increase rate smaller than the normal increase rate in a case where the zero-slip control is established within the predetermined time, and the increase rate until the end of the sweep increase is set to be equal to or less than the normal increase rate. In addition, the hydraulic pressure at the time of the end of the sweep increase is set to be equal to or greater than the hydraulic pressure in a case where the zero-slip control is established within the predetermined time. With such control, in a case where the zero-slip state is not brought even if the zero-slip control is performed, the sweep increase is gently continued to a value close to the complete engagement target hydraulic pressure. For this reason, it is possible to suppress the occurrence of shock when complete engagement is carried out.

According to the present disclosure, in the control of the lockup clutch, it is possible to suppress the occurrence of shock when transition is performed to complete engagement even in a case where the zero-slip state is not brought even though the zero-slip control is performed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described referring to the drawings.

Figure 1:
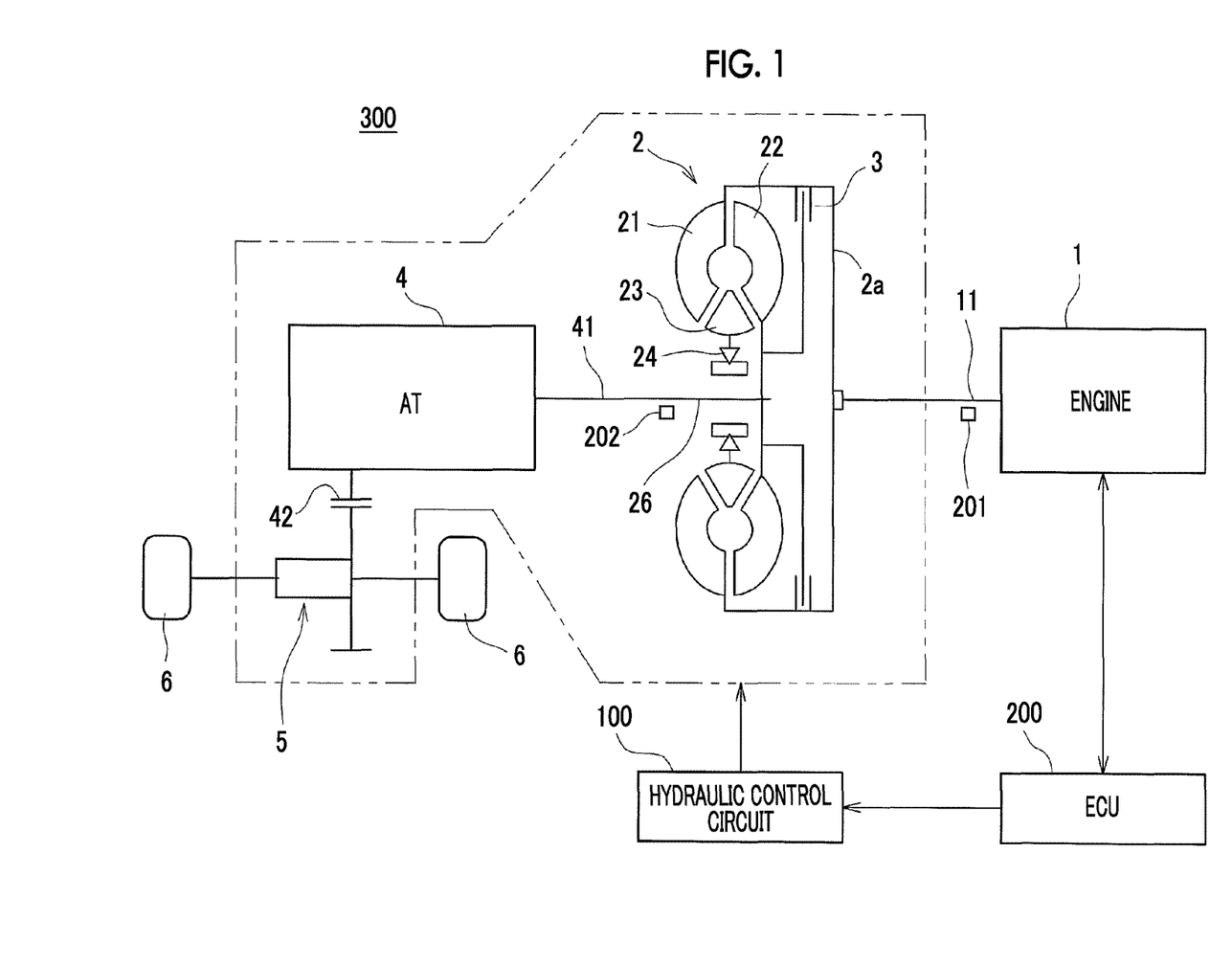
FIG. 1 is a schematic configuration diagram of an embodiment showing an example of a vehicle mounted with a multiple disc lockup clutch to which the present disclosure is applied.

First, an example of a vehicle mounted with a multiple disc lockup clutch to which the present disclosure is applied will be described referring to FIG. 1.

A vehicle 300 of this example is a front engine-front drive (FF) vehicle, engine 1, and includes a torque converter 2, a multiple disc lockup clutch 3, an automatic transmission (AT) 4, a differential device 5, drive wheels (front wheels) 6, driven wheels (rear wheels: not shown), a hydraulic control circuit 100, an electronic control unit (ECU) 200, and the like.

The respective units of the engine 1, the torque converter 2, the multiple disc lockup clutch 3, the automatic transmission 4, the hydraulic control circuit 100, and the ECU 200 will be described below.

The engine 1 is a drive power source for traveling, and is, for example, a multiple cylinder gasoline engine. A crank shaft 11 which is an output shaft of the engine 1 is coupled to the torque converter 2. A rotation speed (engine rotation speed Ne) of the crank shaft 11 is detected by an engine rotation speed sensor 201.

The torque converter 2 includes an input shaft-side pump impeller 21, an output shall-side turbine runner 22, a stator 23 which exhibits a torque amplification function, and a one-way clutch 24, and performs power transmission through a fluid between the pump impeller 21 and the turbine runner 22. The torque converter 2 is provided with the multiple disc lockup clutch 3 which regulates a differential of the torque converter 2. A rotation speed (turbine rotation speed Nt) of a turbine shaft 26 of the torque converter 2 is detected by a turbine rotation speed sensor 202. The torque converter 2 is an example of "a fluid coupling provided in a transmission" of the present disclosure.

Figure 3:
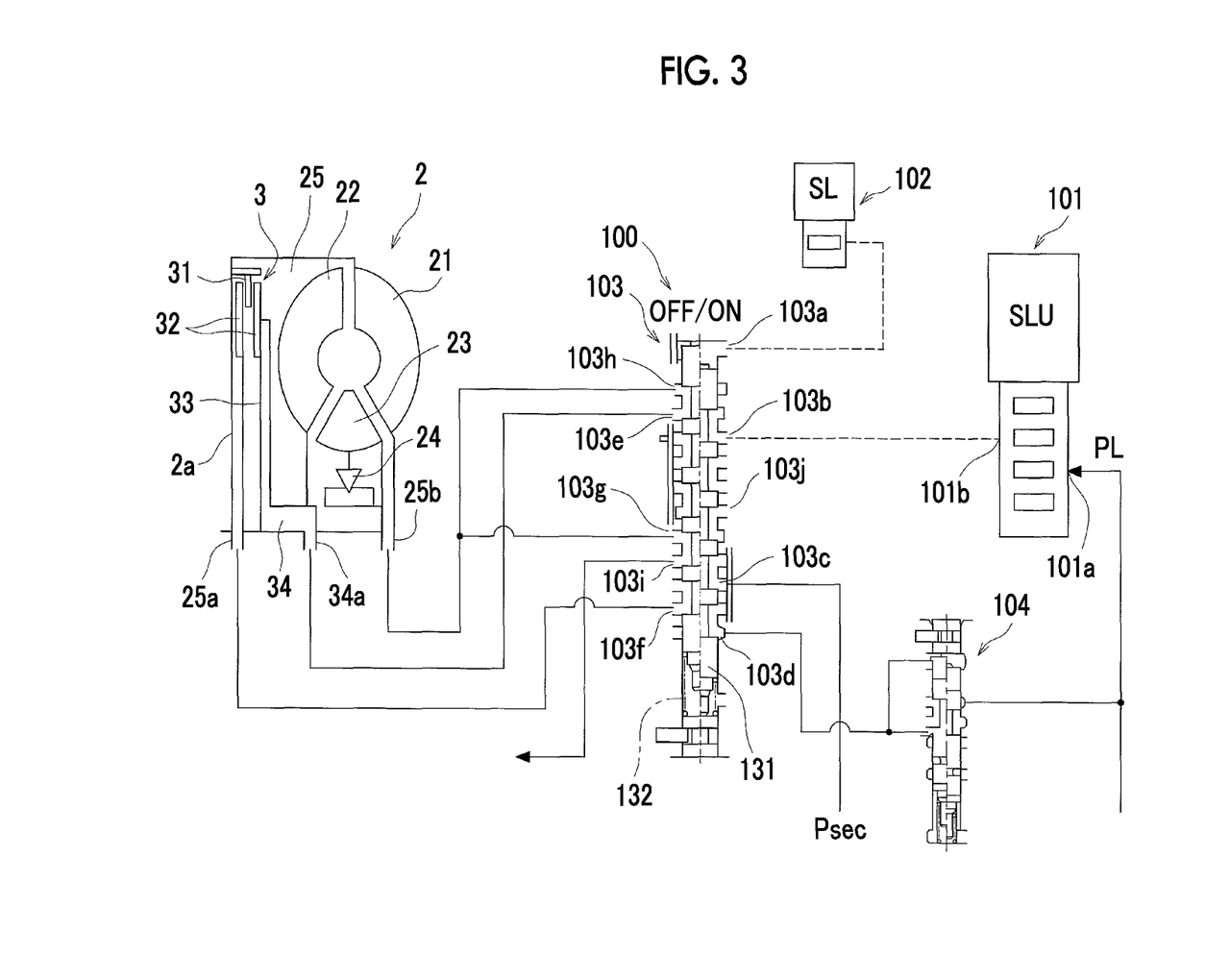
FIG. 3 is a circuit configuration diagram of a hydraulic control circuit in the automatic transmission shown in FIG. 1.

As shown in FIG. 3, a converter oil chamber 25 for hydraulic oil circulation is formed inside the torque converter 2. The converter oil chamber 25 is provided with a T/C input port 25a for introducing hydraulic oil and a T/C output port 25b for discharging hydraulic oil.

As shown in FIG. 3, the multiple disc lockup clutch 3 includes clutch plates (frictional engagement plates) 31, 32, and a lockup piston 33 capable of pressing the clutch plate 31 and the clutch plate 32. The clutch plate 31 is supported by a clutch hub fixed to a front cover 2a of the torque converter 2 to be slidable in an axial direction, and the clutch plate 32 is supported by a clutch hub connected to the turbine runner 22 to be slidable in the axial direction. The lockup piston 33 is provided inside the torque converter 2 to be slidable in the axial direction. On a rear surface side (a side opposite to the front cover 2a) of the lockup piston 33, a lockup oil chamber 34 is formed. The lockup oil chamber 34 is provided with an L/U input port 34a for introducing hydraulic oil (introducing a hydraulic pressure) or discharging hydraulic oil.

In the multiple disc lockup clutch 3 having such a structure, if a hydraulic pressure is supplied to the lockup oil chamber 34, the clutch plate 31 and the clutch plate 32 are engaged and the multiple disc lockup clutch 3 is brought into an engagement state (complete engagement state or slip state). If a hydraulic pressure is not supplied to the lockup oil chamber 34, the lockup piston 33 is operated to a release side with elastic force of a return spring (not shown) and the multiple disc lockup clutch 3 is brought into a release state.

The automatic transmission 4 is a stepped transmission, and includes a plurality of hydraulic frictional engagement elements and a planetary gear device. In the automatic transmission 4, a plurality of frictional engagement elements are selectively engaged, whereby it is possible to selectively establish a plurality of gear stages (gear shift stages). As shown in FIG. 1, an input shaft 41 of the automatic transmission 4 is coupled to the turbine shaft 26 of the torque converter 2. An output gear 42 of the automatic transmission 4 is coupled to the drive wheels 6 through the differential device 5 or the like.

Figure 2:
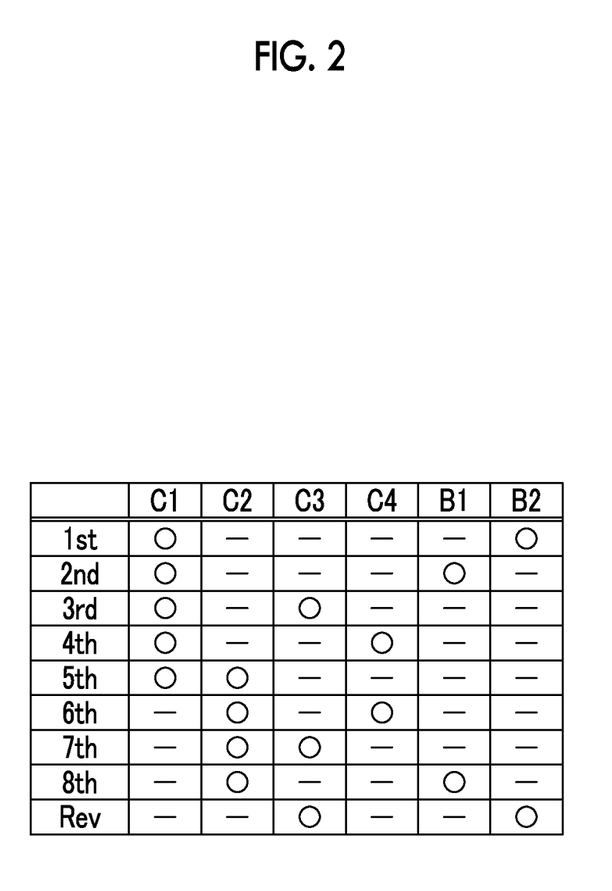
FIG. 2 is an engagement table showing an engagement state of respective clutches and respective brakes of each gear stage in an automatic transmission shown in FIG. 1.

As shown in FIG. 2, the automatic transmission 4 includes, as the hydraulic engagement elements, for example, a first clutch C1 to a fourth clutch C4, and a first brake B1 and a second brake B2. The engagement and release of the four clutches C1 to C4 and the two brakes B1, B2 are controlled, whereby forward eight-speed gear stages (first speed gear stage "1st" to eighth speed gear stage "8th") and a reverse gear stage (reverse gear stage "Rev") are attained. The engagement or release of the clutch C1 to the clutch C4, the brake B1, and the brake B2 is controlled by the hydraulic control circuit 100.

As the automatic transmission 4, other than the stepped automatic transmission (AT), a continuously variable transmission (CVT) which adjusts a gear ratio in a continuously variable manner may be applied.

Next, the hydraulic control circuit 100 will be described referring to FIG. 3. FIG. 3 shows only a hydraulic circuit configuration of the torque converter 2 and the multiple disc lockup clutch 3.

First, though not shown, the hydraulic control circuit 100 of this example includes an oil pump, a primary regulator valve, a secondary regulator valve, and the like. The hydraulic pressure generated by the oil pump is regulated by the primary regulator valve and a line pressure PL is generated. A secondary pressure Psec is regulated by the secondary regulator valve with the line pressure PL, as a source pressure.

The hydraulic control circuit 100 shown in FIG. 3 includes a linear solenoid valve (SW) 101, a solenoid valve (SL) 102, a lockup relay valve 103, a circulation modulator valve 104 (hereinafter, referred to as a Cir-MOD valve 104), and the like.

The linear solenoid valve (SLU) 101 outputs a control hydraulic pressure obtained by regulating the line pressure PL supplied to the input port 101a according to a command (lockup clutch command hydraulic pressure) from the ECU 200 from an output port 101b.

The solenoid valve (SL) 102 outputs a signal pressure if controlled to be turned on according to a command from the ECU 200. The Cir-MOD valve 104 outputs a circulation modulator pressure (hereinafter, referred to as a Cir-MOD pressure) obtained by regulating the line pressure PL.

The lockup relay valve 103 is a switching valve which is operated by the signal pressure from the solenoid valve (SL) 102 to switch a supply and discharge path of a hydraulic pressure.

The lockup relay valve 103 is provided with a signal pressure input port 103a, an L/U pressure input port 103b, a secondary pressure input port 103c, and a Cir-MOD pressure input port 103d. The lockup relay valve 103 is provided with an L/U pressure output port 103e, a T/C pressure output port 103f, two drain pressure input ports 103g, 103h, a cooling port 103i, and a discharge port 103j.

The signal pressure input port 103a is connected to the solenoid valve (SL) 102. The L/U pressure input port 103b is connected to the output port 101b of the linear solenoid valve (SLU) 101. The secondary pressure input port 103c is connected to the secondary regulator valve. The Cir-MOD pressure input port 103d is connected to the Cir-MOD valve 104. The L/U pressure output port 103e is connected to the L/U input port 34a of the multiple disc lockup clutch 3. The T/C pressure output port 103f is connected to the T/C input port 25a of the torque converter 2. The drain pressure input ports 103g, 103h are connected to the T/C output port 25b of the torque converter 2. The cooling port 103i is connected to a cooler (not shown).

Figure 4:
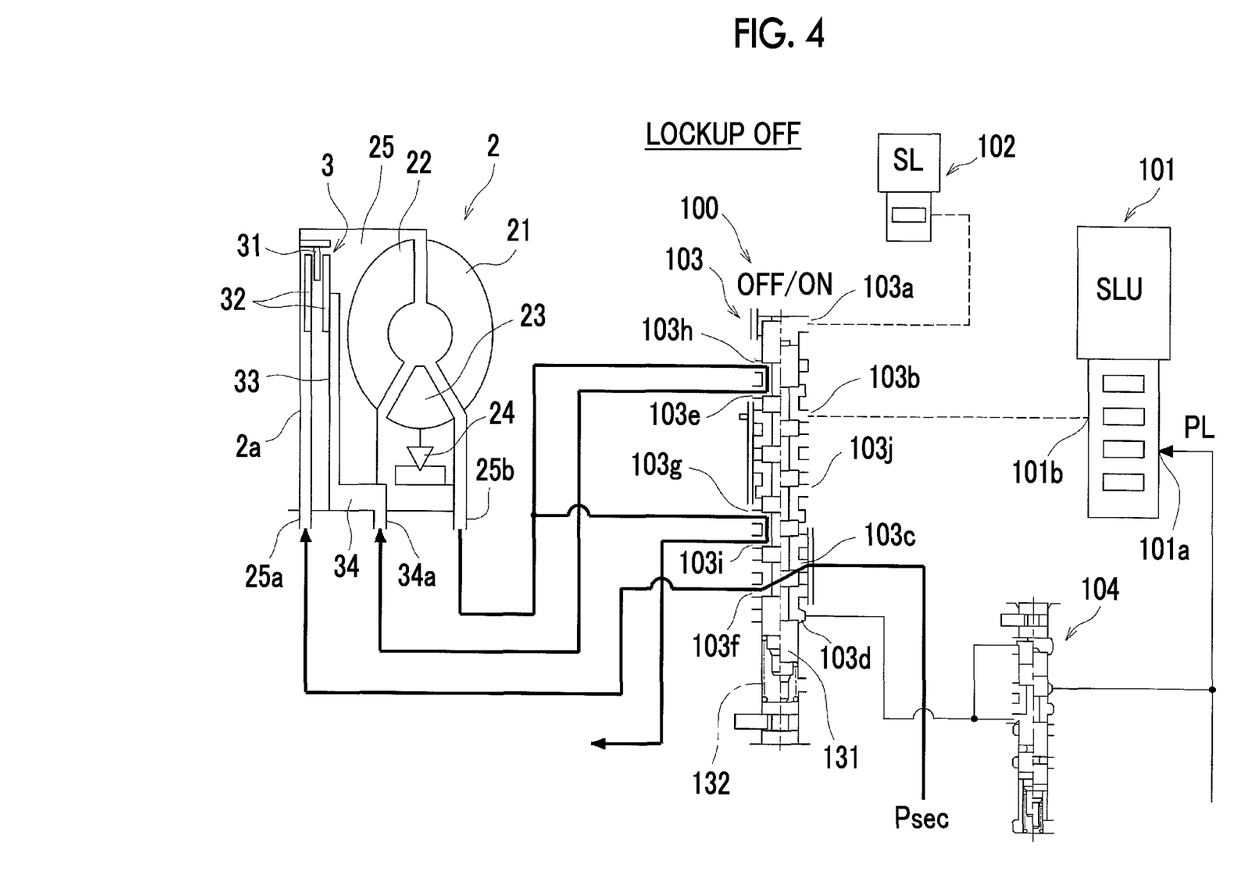
FIG. 4 is a diagram showing an operation at the time of lockup-off in the hydraulic control circuit of FIG. 3.

When the lockup relay valve 103 has no signal pressure from the solenoid valve (SL) 102 input to the signal pressure input port 103a of the lockup relay valve 103 (is in a state of lockup-off), a spool 131 is disposed at an upper position of FIG. 3 (the spool 131 is disposed at a position shown on the left side of FIG. 3) by energizing force of a spring 132. With this, as shown in FIG. 4, the secondary pressure Psec is supplied to the T/C input port 25a (converter oil chamber 25) of the torque converter 2 through the lockup relay valve 103. Hydraulic oil circulating through the converter oil chamber 25 of the torque converter 2 is output from the T/C output port 25b, and flows into the two drain pressure input ports 103g, 103h of the lockup relay valve 103, respectively. Hydraulic oil flowing into the drain pressure input port 103g on the lower side of the drawing is supplied from the cooling port 103i to the cooler. Hydraulic oil flowing into the drain pressure input port 103h on the upper side of the drawing is input from the L/U pressure output port 103e to the L/U input port 34a of the multiple disc lockup clutch 3.

Figure 5:
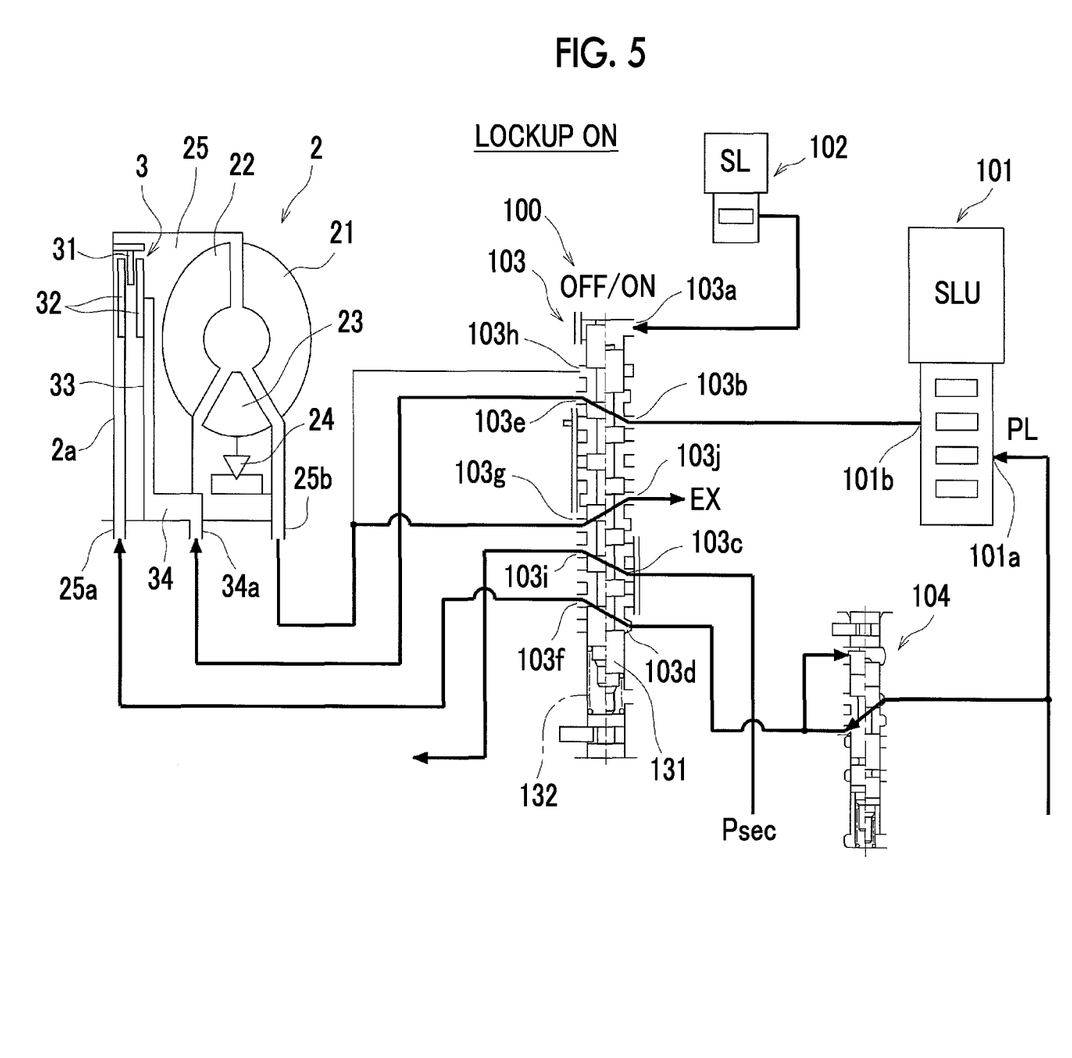
FIG. 5 is a diagram showing an operation at the time of lockup-on in the hydraulic control circuit of FIG. 3.

The linear solenoid valve (SLU) 101 and the solenoid valve (SL) 102 are turned on together according to a command from the ECU 200, and if the signal pressure from the solenoid valve (SL) 102 is input to the signal pressure input port 103a of the lockup relay valve 103 (if a state of lockup-on is brought), the spool 131 moves to the lower side against the energizing force of the spring 132 and is disposed at a lower position of FIG. 3 (the spool 131 is disposed at a position shown on the right side of FIG. 3). With this, as shown in FIG. 5, the Cir-MOD pressure from the Cir-MOD valve 104 is supplied to the T/C input port 25a (converter oil chamber 25) of the torque converter 2 through the lockup relay valve 103. Hydraulic oil circulating through the converter oil chamber 25 of the torque converter 2 is output from the T/C output port 25b, flows into the drain pressure input port 103g on the lower side of the drawing of the lockup relay valve 103, and is discharged from the discharge port 103j. In addition, the control hydraulic pressure output from the linear solenoid valve (SLU) 101 is supplied to the L/U pressure input port 103b (lockup oil chamber 34) of the multiple disc lockup clutch 3 through the lockup relay valve 103.

—ECU—

The ECU 200 includes a central processing unit (CPU), a read only memory (ROM), a random access memory (RAM), a backup RAM, a timer, and the like.

The ROM stores various control programs, maps which are referred to when executing various control programs, and the like. The CPU executes calculation processing based on various control programs and the maps stored in the ROM. The RAM is a memory which temporarily stores calculation results in the CPU, data input from the respective sensors, and the like, and the backup RAM is a nonvolatile memory which stores data or the like to be stored when an engine 301 is stopped, or the like.

Figure 6:
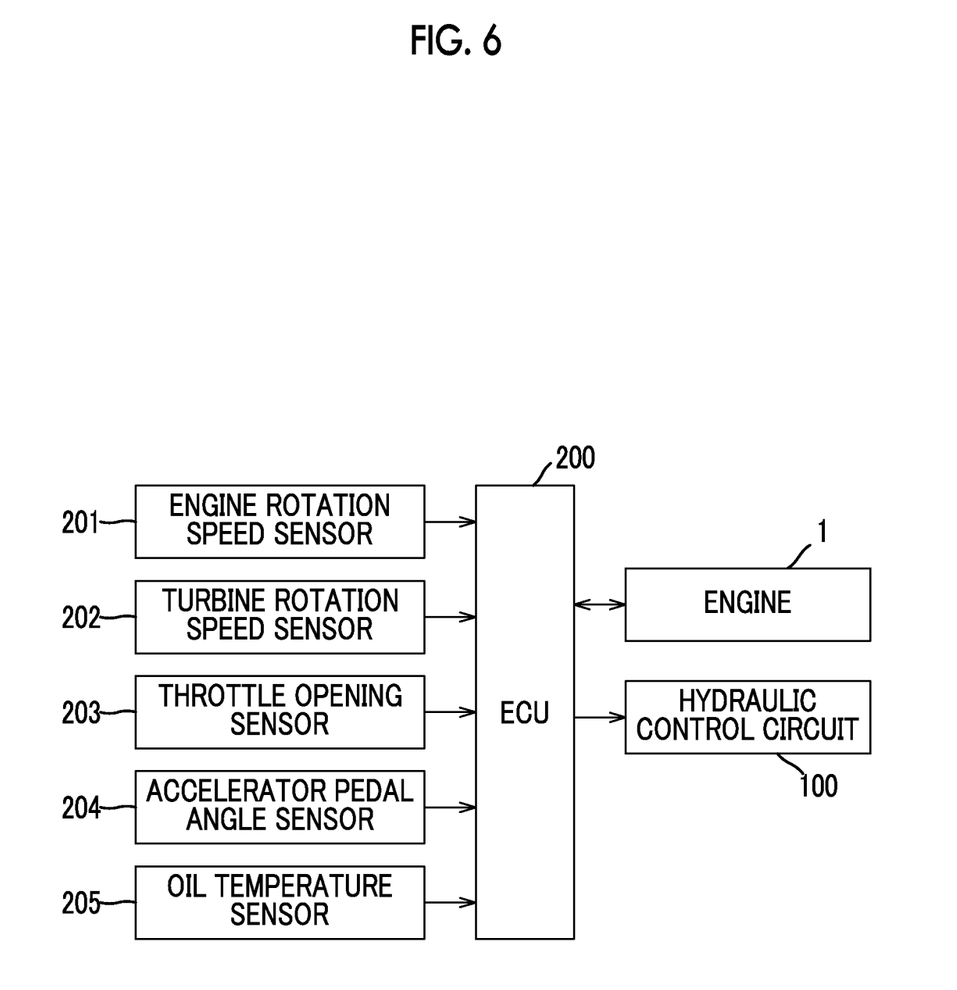
FIG. 6 is a block diagram showing the configuration of a control system, such as an ECU, shown in FIG. 1.

As shown in FIG. 6, various sensors, such as the engine rotation speed sensor 201, the turbine rotation speed sensor 202, a throttle opening sensor 203 detecting a throttle opening of a throttle valve (not shown), an accelerator pedal angle sensor 204 detecting an accelerator pedal angle as the amount of depression of an accelerator pedal (not shown), and an oil temperature sensor 205 detecting the temperature (ATF oil temperature) of hydraulic oil of the automatic transmission 4 and the torque converter 2 (multiple disc lockup clutch 3), are connected to the ECU 200, and signals from the respective sensors (including switches) are input to the ECU 200.

The ECU 200 is configured to control the operation state of the engine 1 by controlling the throttle opening, a fuel injection amount, an ignition timing, and the like based on the detection results of various sensors. The ECU 200 controls the hydraulic control circuit 100 to execute gear shift control of the automatic transmission 4, hydraulic control of the torque converter 2, and hydraulic control of the multiple disc lockup clutch 3.

—Lockup Clutch Hydraulic Control—

Next, the hydraulic control of the multiple disc lockup clutch 3 will be described.

First, the ECU 200 can execute slip control of the multiple disc lockup clutch 3. The slip control is control for calculating actual differential rotation (Ne-Nt) between the engine rotation speed Ne obtained from an output signal of the engine rotation speed sensor 201 and the turbine rotation speed Nt obtained from an output signal of the turbine rotation speed sensor 202 and performing feedback control (F/B control) of lockup clutch hydraulic pressure (command hydraulic pressure) such that the actual differential rotation becomes target differential rotation. Such slip control also includes zero-slip control (target differential rotation zero control) for making the target differential rotation zero (target differential rotation=0 rpm). The differential rotation of the engine rotation speed Ne and the turbine rotation speed Nt is an example of "differential rotation between an input side and an output side of a fluid coupling" of the present disclosure.

In control of the lockup clutch, if a zero-slip state can be created when transition is performed from a slip state to complete engagement, no shock occurs even if transition is performed to complete engagement. However, there is a case where the zero-slip state is not brought according to vehicle traveling conditions even if the zero-slip control is performed (in a case of non-convergence in which the actual differential rotation approaches near 0 rpm before the execution of the complete engagement), and in such a case, if transition is performed to complete engagement, there is a concern that shock occurs. In particular, in a case of the multiple disc lockup clutch 3, since torque capacity is large and a lockup execution area is expanded, the transition frequency from the slip state to complete engagement increases, and there is a possibility that the occurrence frequency of the above-described phenomenon (the occurrence of shock) increases.

In order to eliminate such a point, in this embodiment, hydraulic control capable of suppressing the occurrence of shock when transition is performed to complete engagement is executed even in a case where the zero-slip state is not brought even though the zero-slip control is executed.

Figure 7:
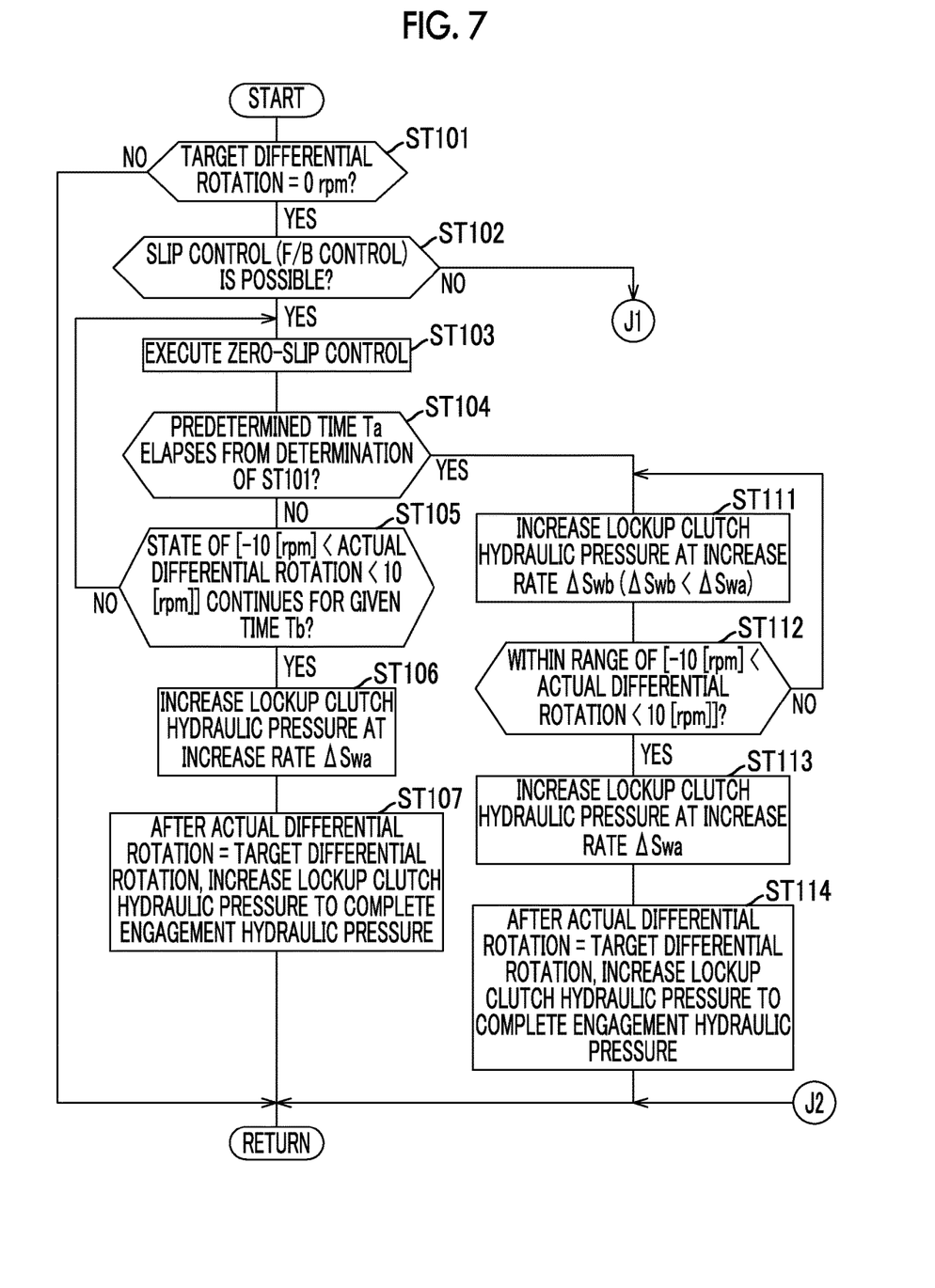
FIG. 7 is a flowchart showing an example of lockup clutch hydraulic control shown in FIG. 1.
Figure 8:
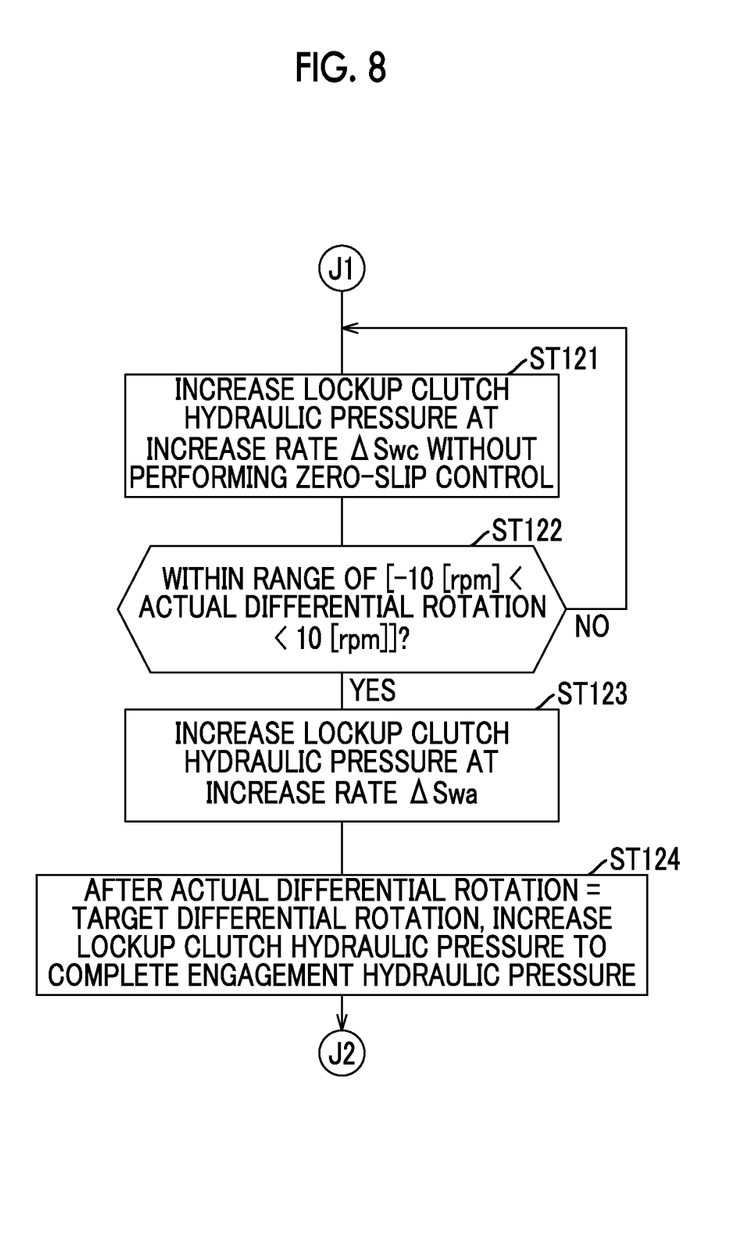
FIG. 8 is a flowchart subsequent to FIG. 7 showing an example of the lockup clutch hydraulic control.

An example of the lockup clutch hydraulic control will be described referring to the flowcharts of FIGS. 7 and 8. A control routine of FIGS. 7 and 8 is executed in the ECU 200.

In the following description of the hydraulic control, a lockup clutch hydraulic pressure is a command hydraulic pressure.

If the control routine of this example is started, in Step ST101, it is determined whether or not the target differential rotation is zero (target differential rotation=0), and in a case where the determination result is negative (NO), return is performed. In a case where the determination result of Step ST101 is affirmative (YES), the process progresses to Step ST102. The ECU 200 starts to count a time (an elapsed time after the target differential rotation becomes 0) from the determination of Step ST101.

In Step ST102, it is determined whether or not the slip control (F/B control) is possible. Specifically, for example, in a case where the oil temperature obtained from an output signal of the oil temperature sensor 205 is an ultralow oil temperature (or a high oil temperature) (oil temperature condition) or in a case where the slip control cannot be executed due to hard requirements or the like of the multiple disc lockup clutch 3 (in a case where slip control prohibition conditions are established), the determination result of Step ST102 is negative (NO), and the process progresses to Step ST121 of FIG. 8. Processing of Step ST121 will be described below.

In a case where the determination result of Step ST102 is affirmative (YES) (in a case where the slip control is possible), the process progresses to Step ST103.

In Step ST103, the zero-slip control is executed. Specifically, the feedback control of the lockup clutch hydraulic pressure command hydraulic pressure) is performed such that the actual differential rotation (Ne-Nt) between the engine rotation speed Ne obtained from the output signal of the engine rotation speed sensor 201 and the turbine rotation speed Nt obtained from the output signal of the turbine rotation speed sensor 202 becomes the target differential rotation (zero).

In Step ST104, it is determined whether or not a predetermined time Ta (Ta=2 sec) from the determination of Step ST101, and in a case where the determination result is negative (NO), the process progresses to Step ST105. The predetermined time Ta used in the determination of Step ST104 may be a value other than 2 sec.

In Step ST105, it is determined whether or not a predetermined time Tb for which the current actual differential rotation is within a range of [−10 [rpm]<actual differential rotation<10 [rpm]] has elapsed (Tb=500 msec), and in a case where the determination result is negative (NO), the process returns to Step ST103 and the zero-slip control is continued. The predetermined time used in the determination of Step ST105 may be a value other than 500 msec. The constants of the actual differential rotation range used in the determination of Step ST105 may be numerical values other than −10 [rpm] and 10 [rpm].

Before the determination result of Step ST104 is affirmative (YES), that is, until 2 sec elapse from the determination of Step ST101, in a case where the determination result of Step ST105 is affirmative (YES), it is determined that the zeros-slip control is established (converged) within a predetermined time and the process progresses to Step ST106.

In Step ST106, the lockup clutch hydraulic pressure sweep-increases at a normal increase rate (sweep rate) ΔSwa such that the actual differential rotation becomes the target differential rotation (zero). After the actual differential rotation=the target differential rotation (zero) with the sweep increase (hydraulic pressure increase) at the normal increase rate ΔSwa, the lockup clutch hydraulic pressure increases to the complete engagement target hydraulic pressure (a hydraulic pressure corresponding to a value obtained by multiplying engine torque by a safety factor) in a stepwise manner (Step ST107). Thereafter, return is performed. The control executed in Steps ST106 and ST107 is complete engagement control.

Even in a case where the determination result of Step ST104 described above is affirmative (YES), that is, even if the predetermined time Ta (2 sec) has elapsed from the determination of Step ST101 (after the target differential rotation=0), in a case where the determination result of the Step ST105 is not affirmative (YES) (in a case where the zero-slip control is not established (converged) within the predetermined time), the process progresses to Step ST111.

In Step ST111, a sweep increase of the lockup clutch hydraulic pressure starts at an increase rate ΔSwb (ΔSwb<ΔSwa) smaller than the normal increase rate ΔSwa in Step ST106 described above (the sweep increase starts at an increase rate smaller than that in a case where the zero-slip control is established within the predetermined time). The sweep increase (hydraulic pressure increase) started at the increase rate ΔSwb is continued until the current actual differential rotation falls within the range of [−10 [rpm]<actual differential rotation<10 [rpm]] (is continued until the determination result of Step ST112 is affirmative (YES)), and when the actual differential rotation falls within this range, the process progresses to Step ST113.

In Step ST113, the lockup clutch hydraulic pressure sweep-increases at the normal increase rate ΔSwa (at the same increase rate as that in a case where the zero-slip control is established within the predetermined time) such that the actual differential rotation becomes the target differential rotation (zero). After the actual differential rotation=the target differential rotation (zero) with the sweep increase (hydraulic pressure increase) at the normal increase rate ΔSwa, the lockup clutch hydraulic pressure increases to the complete engagement target hydraulic pressure in a stepwise manner (Step ST114). Thereafter, return is performed. The control executed in Steps ST113 and ST114 is complete engagement control.

In a case where the determination result of Step ST102 described above is negative (NO), that is, in a case where the slip control (the feedback control for bringing the actual differential rotation close to the target differential rotation) is impossible, the process progresses to Step ST121 of FIG. 8.

In Step ST121, the zero-slip control is not performed, and the lockup clutch hydraulic pressure increases with a compulsory sweep increase. An increase rate ΔSwc of the compulsory sweep increase is set to an increase rate (ΔSwc<ΔSwb<ΔSwa) smaller than the increase rate ΔSwb in Step ST111 described above in order to reduce the occurrence of shock. The compulsory sweep increase (hydraulic pressure increase) is continued until the actual differential rotation falls within the range of [−10 [rpm]<actual differential rotation<10 [rpm]] (is continued until the determination result of Step ST122 is affirmative (YES)), and after the actual differential rotation falls within this range, in Steps ST123 and ST124, the complete engagement control is executed in the same manner as in Steps ST112 and ST114.

Step ST101 to Step ST107 and Step ST111 to Step ST114 of FIG. 7 are executed by the ECU 200, whereby "zero-slip control means" and "hydraulic pressure increase control means" of the present disclosure are implemented.

Figure 9:
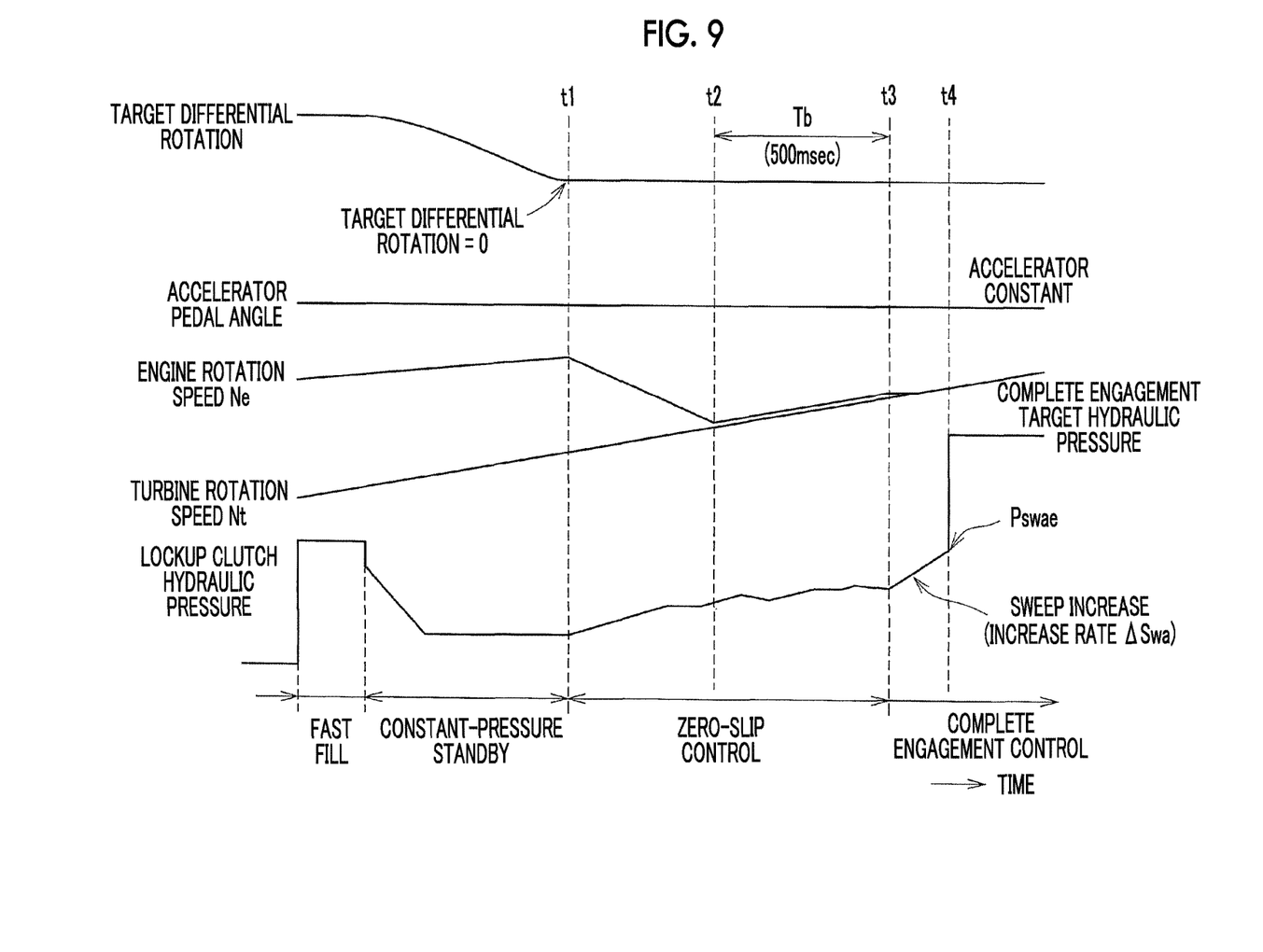
FIG. 9 is a timing chart showing an example of the lockup clutch hydraulic control when control is performed according to the flowcharts shown in FIGS. 7 and 8.
Figure 10:
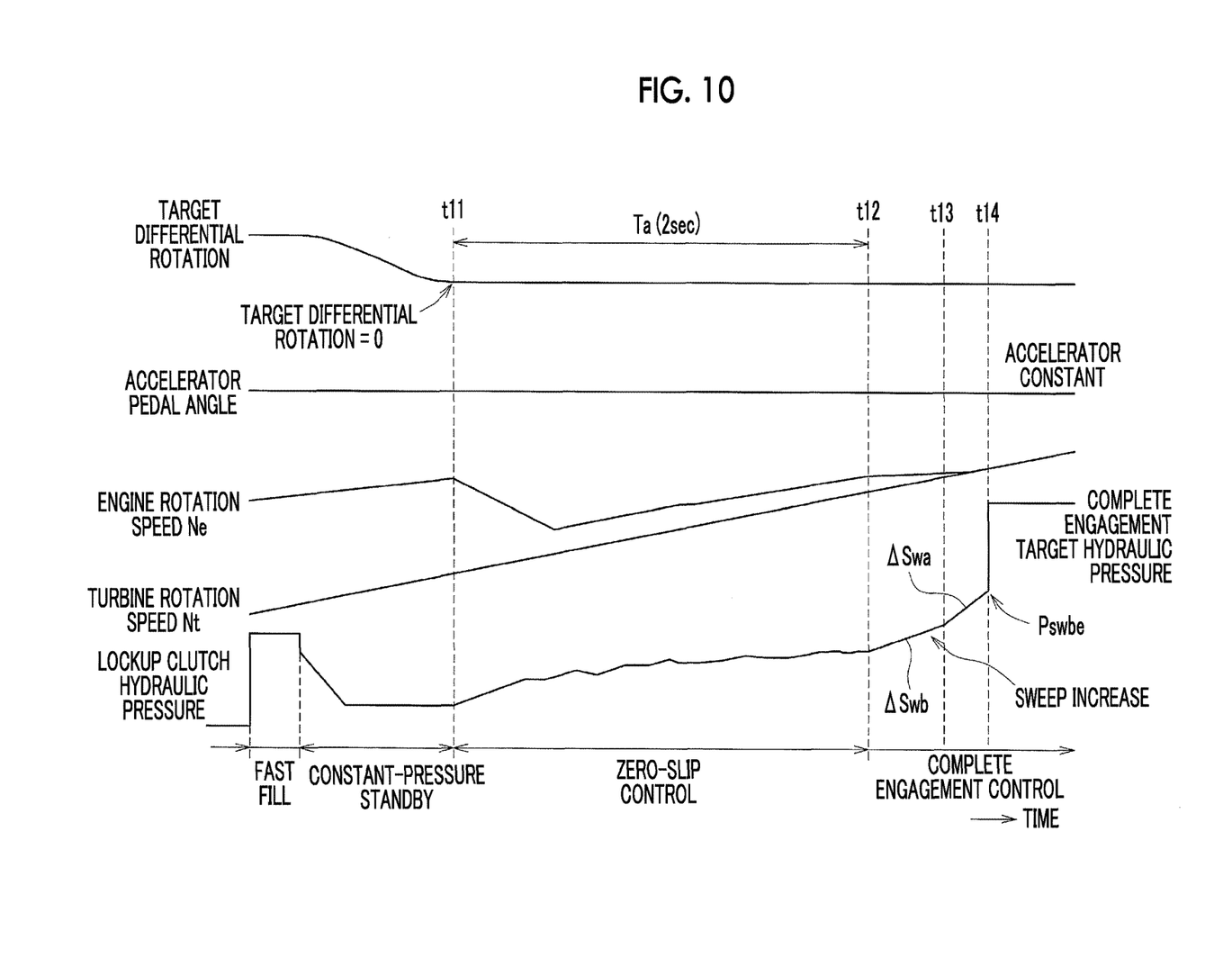
FIG. 10 is a timing chart showing a first modification example as another example of the lockup clutch hydraulic control.
Figure 11:
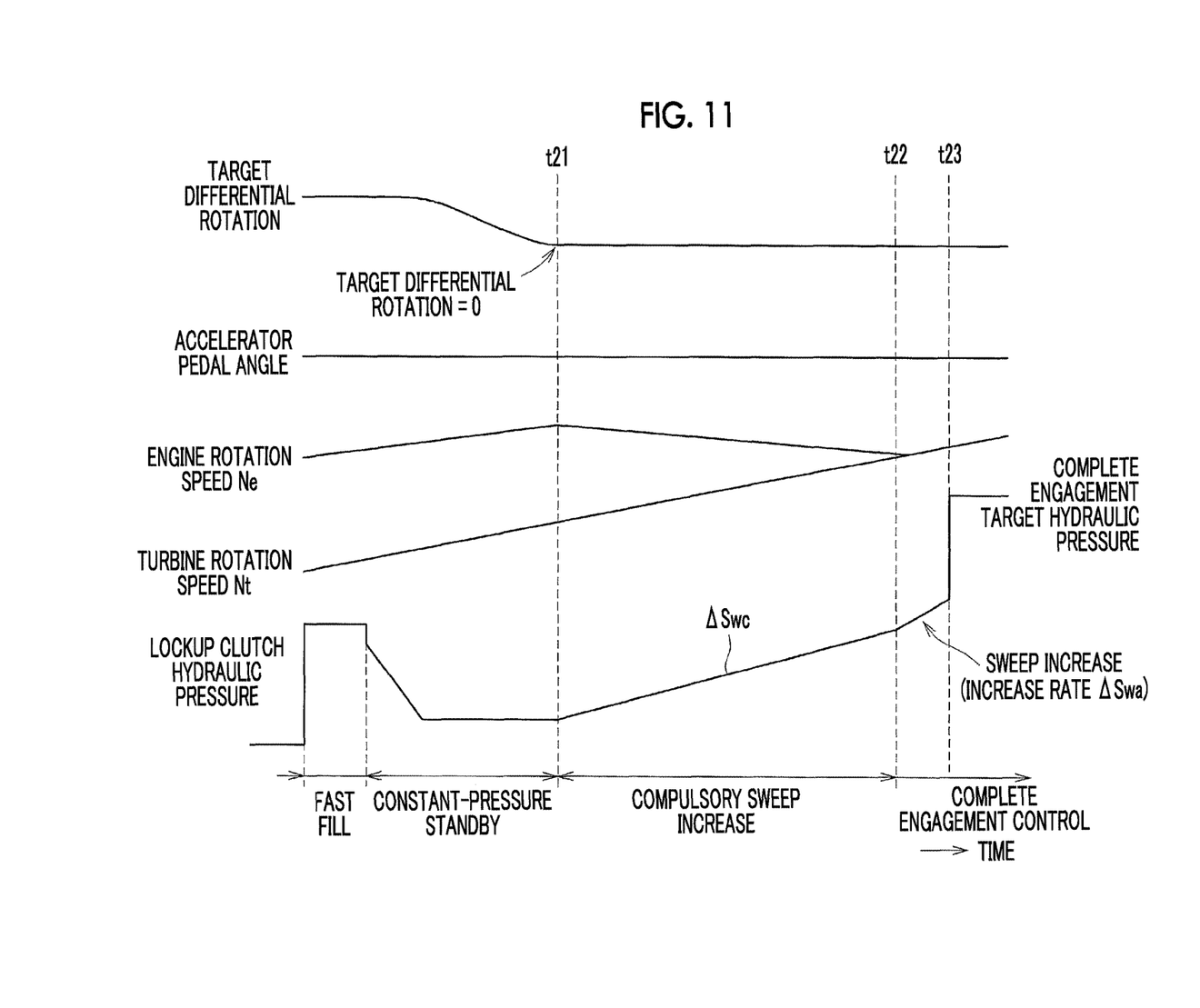
FIG. 11 is a timing chart showing a second modification example as still another example of the lockup clutch hydraulic control.

Next, a specific example of the lockup clutch hydraulic control will be described referring to the timing chart of FIG. 9. In FIG. 9, FIG. 10 showing a first modification example described below, and FIG. 11 showing a second modification example, the lockup clutch hydraulic pressure indicates a command hydraulic pressure.

First, in a case of engaging the multiple disc lockup clutch 3, a fast fill for temporarily increasing the lockup clutch hydraulic pressure is executed. After the fast fill, the lockup clutch hydraulic pressure decreases and is maintained at a predetermined constant standby pressure for a given time, thereby packing the multiple disc lockup clutch 3.

After the fast fill and the constant-pressure standby described above are performed, at the time t1 when the target differential rotation becomes zero (target differential rotation=0 rpm) (when the vehicle is in a lockup area), the zero-slip control is executed (Step ST101 to Step ST103 of the control routine of FIG. 7). During the zero-slip control the increase rate of the sweep increase when increasing the lockup clutch hydraulic pressure may be set to be variable according to the magnitude of the actual differential rotation (Ne-Nt) at the time t1.

The actual differential rotation falls within the range of [−10 [rpm]<actual differential rotation<10 [rpm]] (the time t2) until the predetermined time Ta (Ta=2 sec) has elapsed from the time t1 when the target differential rotation=0 rpm after the above-described zero-slip control is executed, and the time t3 when the state of falling within this range is continued for a given time Tb (Tb=500 msec) (the time when Step ST105 of the control routine of FIG. 7 is affirmative (YES)), the lockup clutch hydraulic pressure increases at the normal increase rate ΔSwa (Step ST106 of the control routine of FIG. 7).

The actual differential rotation=the target differential rotation (zero) with the sweep increase (hydraulic pressure increase) at the increase rate ΔSwa, and thereafter, the lockup clutch hydraulic pressure increases to the complete engagement target hydraulic pressure in a stepwise manner at the time t4 (Step ST107 of the control routine of FIG. 7), thereby bringing the multiple disc lockup clutch 3 into a complete engagement state.

In this way, in a case of the example shown in. FIG. 9, it is possible to end the zero-slip control within the predetermined time Ta (before complete engagement starts). That is, since it is possible to bring the zero-slip state when transition is performed from the slip state to complete engagement, no shock occurs even if transition is performed to complete engagement.

Next, an example of a case where the zero-slip control cannot end within the predetermined time (before complete engagement starts) will be described referring to the timing chart of FIG. 10.

Even in this example, although the zero-slip control starts at the time t11 when the target differential rotation=0 rpm after the fast fill and the constant-pressure standby for a given time are performed, even if the predetermined time Ta (Ta=2 sec) has elapsed from the time t11 when the target differential rotation=0 rpm, in a case where the actual differential rotation does not fall within the range of [−10 [rpm]<actual differential rotation<10 [rpm]] (in a case where the zero-slip control is not established (converged) within the predetermined time), the lockup clutch hydraulic pressure sweep-increases at the increase rate ΔSwb (ΔSwb<ΔSwa) smaller than the normal increase rate ΔSwa at the time t12 (Step ST111 of the control routine of FIG. 7).

At the time t13 when the actual differential rotation falls within the range of [−10 [rpm]<actual differential rotation<10 [rpm]] with the sweep increase (hydraulic pressure increase) at the increase rate ΔSwb, the increase rate of the sweep increase changes to the normal increase rate ΔSwa (the same increase rate as that in a case where the zero-slip control is established within the predetermined time) and the sweep increase is performed (Step ST112 and Step ST113 of the control routine of FIG. 7). The actual differential rotation=the target differential rotation (zero) with the sweep increase (hydraulic pressure increase) at the increase rate ΔSwa, and thereafter, the lockup clutch hydraulic pressure increases to the complete engagement target hydraulic pressure in a stepwise manner at the time t14 (Step ST114 of the control routine of FIG. 7), thereby bringing the multiple disc lockup clutch 3 into the complete engagement state.

A hydraulic pressure Pswbe when the sweep increase during a period of t12 to t14 of FIG. 10, that is, the sweep increase in a case where the zero-slip control is not established within the predetermined time ends (time t14) is set to be equal to or greater than a hydraulic pressure Pswae when the normal sweep increase in a case where the zero-slip control is established within the predetermined time sweep increase ends (when the sweep increase during a period of t3 to t4 of FIG. 9 ends (time t4)).

More preferably, the hydraulic pressure Pswbe when the sweep increase ends is set to be higher than the hydraulic pressure Pswae when the normal sweep increase ends. With this, it is possible to bring the hydraulic pressure Pswbe when the sweep increase ends close to the complete engagement target hydraulic pressure compared to a case where the zero-slip control is established within the predetermined time, and to further suppress the occurrence of shock at the time of complete engagement.

In a case where the slip control (DB control) is impossible (in a case where the determination of Step ST102 of the control routine of FIG. 7 is negative), as shown in FIG. 11, after the fast fill and the constant-pressure standby for a given time are performed, from the time t21 when the target differential rotation=0, the lockup clutch hydraulic pressure compulsorily increases at the increase rate ΔSwc (ΔSwc<ΔSwb<ΔSwa) (Step ST121 of the control routine of FIG. 8). At the time t22 when the actual differential rotation falls within the range of [−10 [rpm]<actual differential rotation<10 [rpm]] with the sweep increase (hydraulic pressure increase) at the increase rate ΔSwc, the increase rate of the sweep increase changes to the normal increase rate ΔSwa and the sweep increase is performed (Step ST122 and Step ST123 of the control routine of FIG. 8). The actual differential rotation=target differential rotation (zero) with the sweep increase (hydraulic pressure increase) at the increase rate ΔSwa, and thereafter, the lockup clutch hydraulic pressure increases to the complete engagement target hydraulic pressure in a stepwise manner at the time t23 (Step ST124 of the control routine of FIG. 8), thereby bringing the multiple disc lockup clutch 3 into the complete engagement state.

<Effects> As described above, according to this embodiment, in the engagement control of the multiple disc lockup clutch 3, in a case where the zero-slip control is not established (converged) within the predetermined time, the lockup clutch hydraulic pressure sweep-increases to the zero-slip state at the increase rate ΔSwb (the increase rate smaller than that in a case where the zero-slip control is established within the predetermined time) smaller than the normal increase rate ΔSwa, and thereafter, the lockup clutch hydraulic pressure sweep-increases at the normal increase rate ΔSwa. In addition, the hydraulic pressure Pswbe when such sweep increase ends is set to be equal to or greater than the hydraulic pressure Pswae in a case where the zero-slip control is established within the predetermined time. With such control of the lockup clutch, in a case where the zero-slip state is not brought even if the zero-slip control is performed, the sweep increase is gently continued to a value close to the complete engagement target hydraulic pressure. For this reason, it is possible to suppress the occurrence of shock when transition is performed to complete engagement.

The embodiment disclosed herein is illustrative in all sorts of points, and does not serve as grounds for restrictive interpretation. Therefore, the technical scope of the present disclosure should not be interpreted based on only the above-described embodiment, but is determined based on the description of the scope of the claims. Furthermore, the technical scope of the present disclosure includes the equivalents and all sorts of alterations within the scope of the claims.

For example, in the above-described embodiment, although the lockup oil chamber 34 of the multiple disc lockup clutch 3 is provided inside the torque converter 2, the present disclosure is not limited thereto, and the present disclosure can be applied to a case where a lockup oil chamber of a multi-stage lockup clutch is provided outside a torque converter.

In the above-described embodiment, although an example where the control device of the present disclosure is applied to a multi-stage lockup clutch mounted in a front engine-front drive (FT) vehicle, the present disclosure is not limited thereto, and may be applied to a control device of a lockup clutch mounted in a front engine-rear drive (FR) vehicle or a four-wheel drive vehicle.

The present disclosure can be effectively used in control of a lockup clutch capable of regulating a differential of a fluid coupling (torque converter) provided in a transmission.

What is claimed is:

1. A transmission comprising:
a fluid coupling configured to transmit power input from an input side of the fluid coupling to an output side of the fluid coupling through a fluid;
a lockup clutch configured to control a differential of the fluid coupling; and
an electronic control unit configured to:
    (i) execute a zero-slip control that makes a target differential rotation of a differential rotation between the input side of the fluid coupling and the output side of the fluid coupling zero,
    (ii) sweep-increase a lockup clutch hydraulic pressure to a predetermined hydraulic pressure and subsequently increase the lockup clutch hydraulic pressure to a complete engagement target hydraulic pressure, and
    (iii) upon the zero-slip control not being established within a predetermined time:
        (a) start a sweep increase at an increase rate smaller than a normal increase rate, the normal increase rate being obtained when the zero-slip control is established within the predetermined time,
        (b) set the increase rate until an end of the sweep increase to be equal to or less than the normal increase rate, and
        (c) set a hydraulic pressure at the time of the end of the sweep increase to be equal to or greater than a hydraulic pressure upon the zero-slip control being established within the predetermined time.

* * * * *